United States Patent
Leman

(10) Patent No.: US 6,373,468 B1
(45) Date of Patent: Apr. 16, 2002

(54) REVERSIBLE ERGONOMIC POINTER DEVICE

(75) Inventor: Michael V. Leman, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/313,815

(22) Filed: May 18, 1999

(51) Int. Cl.⁷ .................................................. G09G 5/08
(52) U.S. Cl. ........................ 345/163; 345/167; 463/37
(58) Field of Search .............................. 345/156–169, 345/145; 463/37–39; 341/20, 22; D14/325, 402, 417; 273/148 B

(56) References Cited

U.S. PATENT DOCUMENTS

| | | | | |
|---|---|---|---|---|
| 5,287,090 A | * | 2/1994 | Grant | 345/163 |
| 5,576,733 A | * | 11/1996 | Lo | 345/163 |
| 5,691,747 A | * | 11/1997 | Amano | 345/167 |
| 5,870,080 A | * | 2/1999 | Burnett et al. | 345/163 |
| 6,031,522 A | * | 2/2000 | Strand | 345/163 |
| 6,072,471 A | * | 6/2000 | Lo | 345/163 |

\* cited by examiner

*Primary Examiner*—Lun-Yi Lao
(74) *Attorney, Agent, or Firm*—Trop, Pruner & Hu, P.C.

(57) ABSTRACT

A pointer device having an ergonomically contoured shell with a first set of one or more button tabs at a first end and a second set of one or more button tabs at a second end, and a first set of locking elements. The pointer device also includes a base having a second set of locking elements adapted to mate with the first set of locking elements, the first and second sets of locking elements adapted to allow the shell to be removably coupled to the base, and one or more switches adapted to be activated by the first set of one or more button tabs when the shell is coupled to the base in a left-handed configuration and the second set of one or more button tabs when the shell is coupled to the base in a right-handed configuration. The pointer device may me included in a computer system, wherein the computer system includes a processing module (including a central processing unit and memory) and, perhaps, a display unit.

40 Claims, 5 Drawing Sheets

REVERSIBLE ERGONOMIC POINTER DEVICE

BACKGROUND

The invention relates generally to cursor control units for use with a computer system and, more particularly, to a reversible ergonomic pointer device. As used herein, an ergonomic pointer device is one which supports an operator's hand in a biomechanically neutral position during use.

Many modern computer systems are configured to use a pointer device to control a screen cursor and/or provide operator input. One illustrative pointer device is the "mouse." As a mouse is moved, a ball is rotated which causes two perpendicular slotted disks to alternately open and close a photosensor assembly. The number of open and close operations is used to generate an unambiguous indication of the mouse's motion in the X and Y directions. In addition, the number of open and close operations per second indicates the speed of the mouse's motion. Another illustrative pointer device is the trackball which is, for practical purposes, an upside down mouse. Yet another illustrative pointer device is the eraser-head unit. Eraser-head units are distinguished by their use of a force sensitive resistor to detect direction and speed of motion.

Pointer devices such as those described above generally provide one or more buttons which, when activated, allow operator input. It is common for a pointer device for use in a WINDOWS® based computer system to have two or three buttons. Pointer devices designed for use in a MACINTOSH® based computer system typically have one or two buttons.

Many of the original pointer devices were designed for use by either a left-handed or a right-handed operator. More recently, pointer devices have been developed for use by either a left-handed or a right-handed operator. Pointer devices of the latter type are often referred to as "ergonomic" pointers. There are currently a variety of commercially available ergonomic mice and trackball devices.

Because of their physical construction, ergonomic units designed for a left-handed operator are not easily used by a right-handed operator and visa versa. If a computer system is shared by multiple users, some of which are left-handed and some of which are right-handed, two different ergonomic pointer devices may be needed. This, in turn, may require disconnecting and connecting the different devices as each operator uses the computer system.

Thus, it would be beneficial to provide a single ergonomic pointer device that may be adapted to either a left-handed or a right-handed operator.

SUMMARY

In one embodiment the invention provides a pointer device having an ergonomically contoured shell with a first set of one or more button tabs at a first end and a second set of one or more button tabs at a second end, and a first set of locking elements. The pointer device also includes a base having a second set of locking elements adapted to mate with the first set of locking elements, the first and second sets of locking elements adapted to allow the shell to be removably coupled to the base, and one or more switches adapted to be activated by the first set of one or more button tabs when the shell is coupled to the base in a left-handed configuration and the second set of one or more button tabs when the shell is coupled to the base in a right-handed configuration. In another embodiment of the invention, a computer system includes a pointer device in accordance with the invention coupled to a computer system, wherein the computer system may include a processing module (including a central processing unit and memory) and, perhaps, a display unit.

DETAILED DESCRIPTION

A reversible ergonomic pointer device is described. The following embodiments, described in terms of a mice and trackball units, are illustrative only and are not to be considered limiting in any respect.

Figure 1:
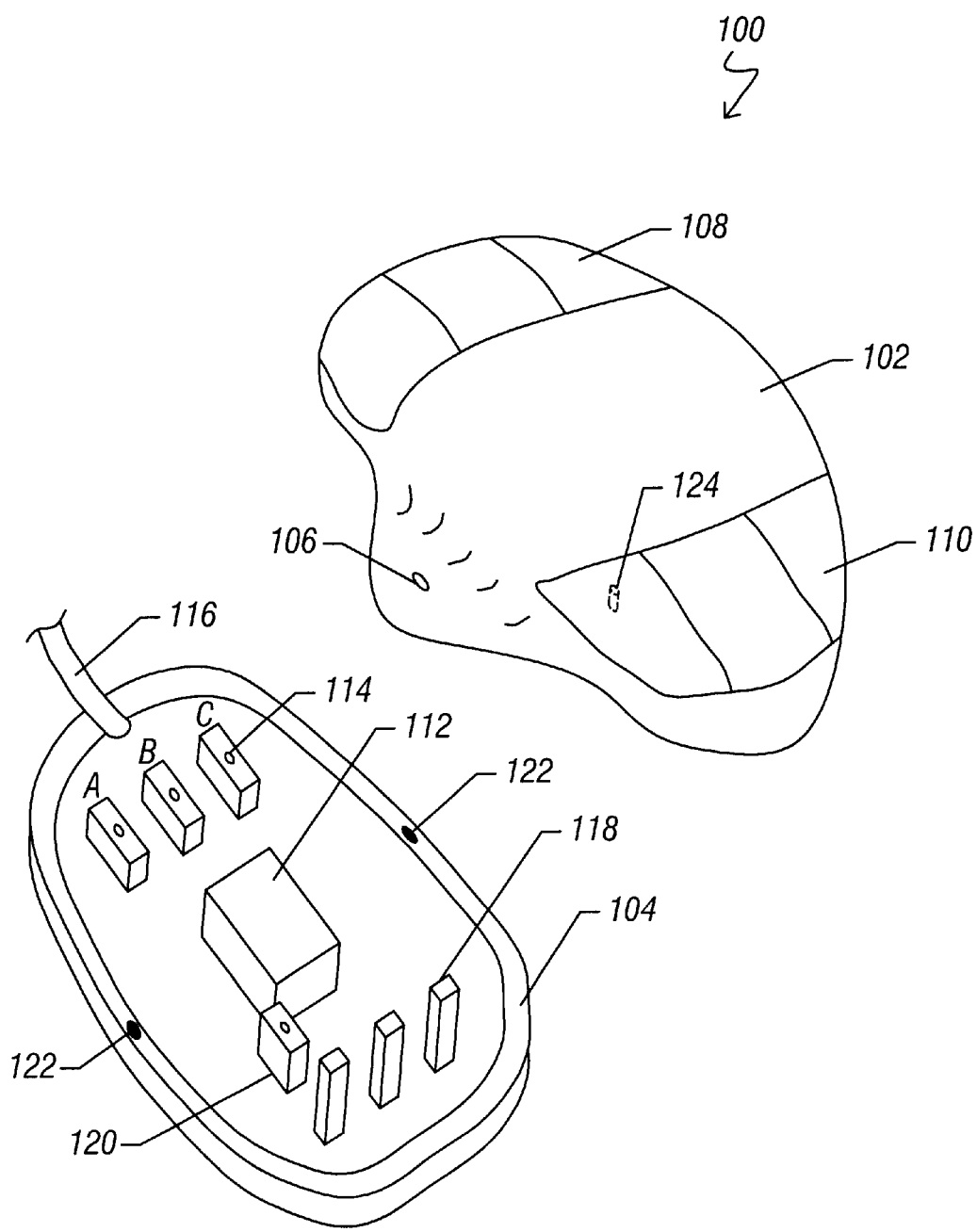
FIG. 1 shows an oblique view of a reversible ergonomic mouse in accordance with one embodiment of the invention.

Referring to FIG. 1, an oblique view of reversible ergonomic mouse 100 in accordance with one embodiment of the invention is shown. Reversible ergonomic mouse 100 includes shell 102 and detachable base 104. Shell 102 provides an ergonomic contour which removably attaches to base 104. Base 104 houses the necessary electronic and mechanical components needed to provide pointer device functionality.

Figure 2A:
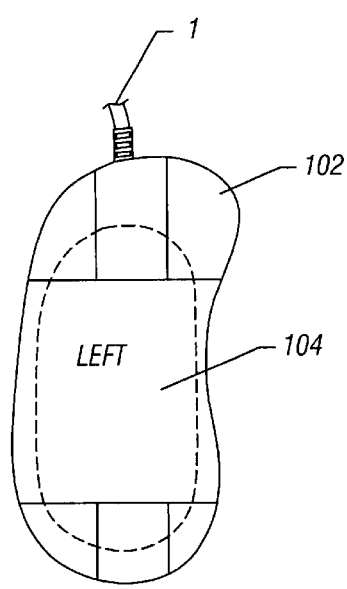
FIGS. 2A and 2B show top and rear views respectively of a left-handed configuration for the mouse of FIG. 1.
Figure 2C:
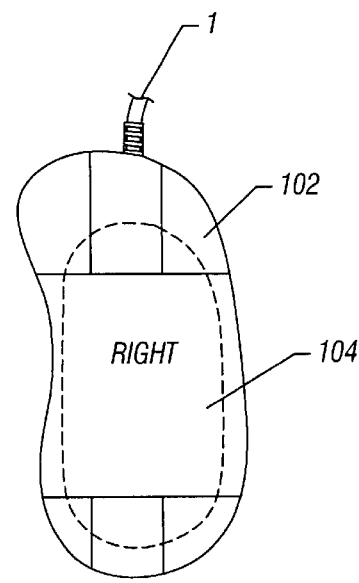
FIGS. 2C and 2D show top and rear views respectively of a right-handed configuration for the mouse of FIG. 1.
Figure 2B:
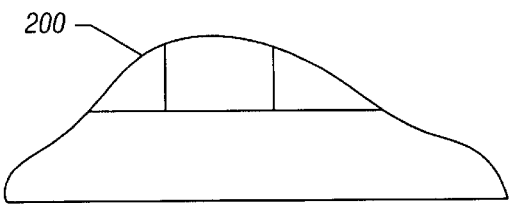
Figure 2D:
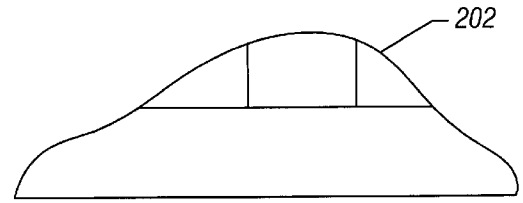

Referring to FIG. 2A, in one configuration shell 102 is coupled to base 104 so that it provides an ergonomic fit for a left-handed operator 200. Referring to FIG. 2B, left-handed configuration 200 may be characterized by an increased right-to-left height when viewed from the rear of the mouse (that end opposite cable 116). Referring to FIG. 2C, in another configuration shell 102 may be detached from base 104, rotated 180°, and reattached to base 104 so that it provides an ergonomic fit for a right-handed operator 202. Referring to FIG. 2D, right-handed configuration 202 may be characterized by an decreased right-to-left height when viewed from the rear of the mouse (that end opposite cable 116).

Referring again to FIG. 1, shell 102 includes two or more clasps 106 (only one is shown) for coupling to base 104. Clasps 106 may be any type that allows repeated operation. Shell 102 also includes two sets of button tabs, 108 and 110. Only one set of button tabs are operational at a time: one set in the left-handed configuration and the other set in the right-handed configuration (see discussion below). Base 104 includes motion detection assembly 112 for generating a signal indicative of mouse 100 motion, switches 114 to generate signals indicative of which operational buttons (on shell 102) are being activated by an operator, cable 116 to transmit and receive signals to a computer system (not shown), bosses 118 to lock out one set of button tabs on the shell (those button tabs 108 or 110 that are adjacent an operator's wrist), switch 120 to generate a signal indicative of whether mouse 100 is in a left-handed or a right-handed configuration, and receptors 122 to mate with clasps 106.

By convention, that button beneath an operator's index finger is designated as the dominant button. Thus, when in the left-handed configuration switch 114-C may be the dominant button and when in the right-handed configuration, switch 114-A may be selected as the dominant button. Switch 120 provides a mechanism for mouse circuitry (not shown) to detect which configuration shell 102 is in and, based on this determination, select either switch 114-A or 114-C as the dominant button. For example, if shell 102 is in a left-handed configuration then button tabs 108 are to be active with that button tab above switch 114-A being the dominant button, button tabs 110 are to be locked out, and nub 124 (on the underside of one of button tabs 110) may make contact with and activate switch 120. When activated, switch 120 indicates to mouse circuitry (not shown) that the mouse is in a left-handed configuration. Alternatively, when in the right-handed configuration switch 120 is not activated—indicating a right-handed configuration.

Figure 3A:
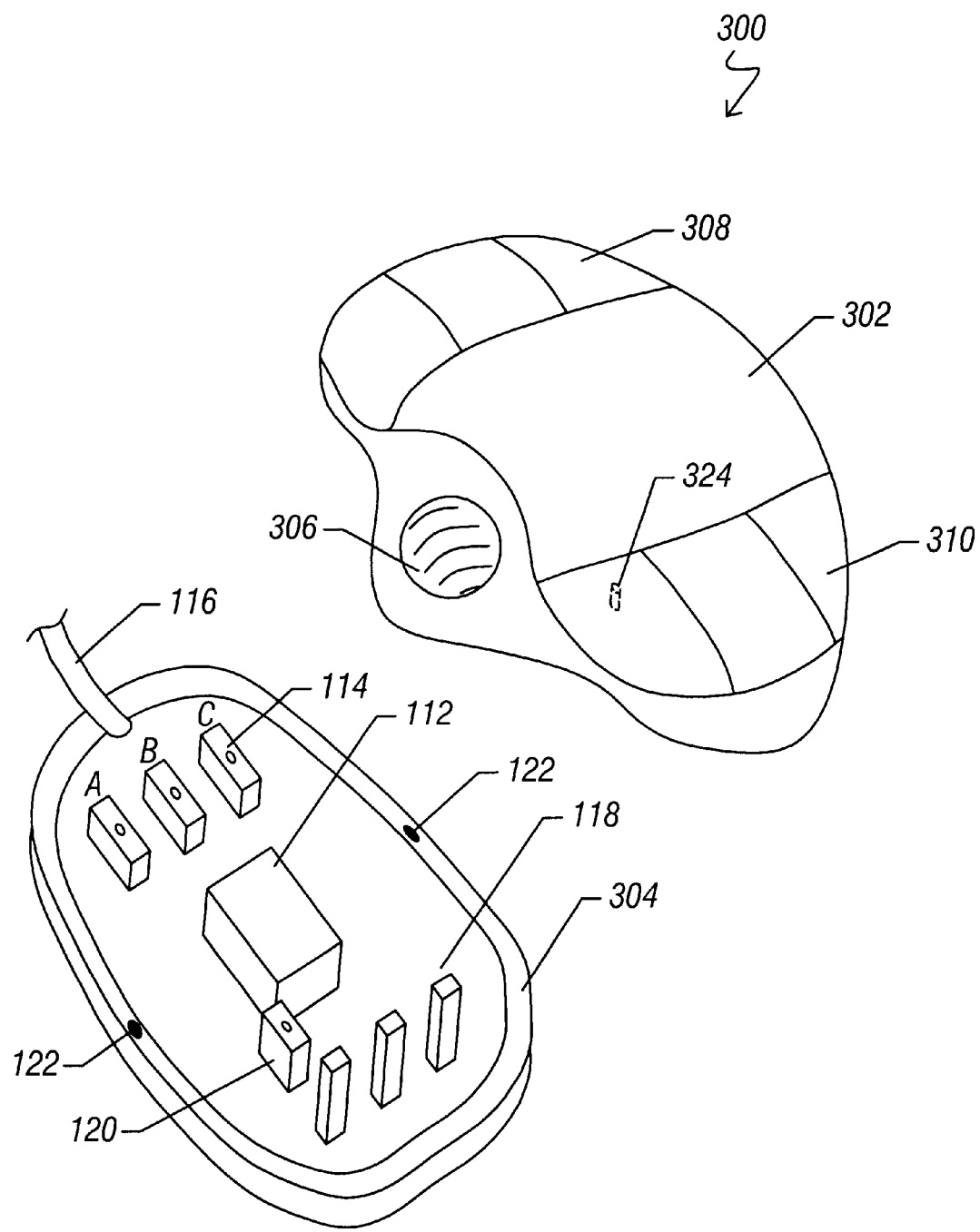
FIGS. 3A and 3C show oblique and top views respectively of a reversible ergonomic trackball in accordance with another embodiment of the invention.
Figure 3B:
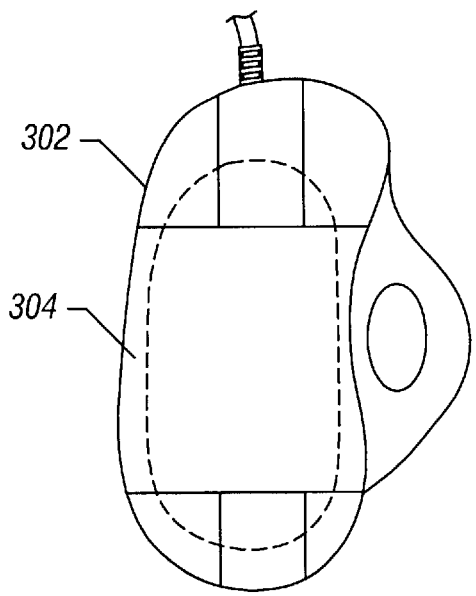
Figure 3C:
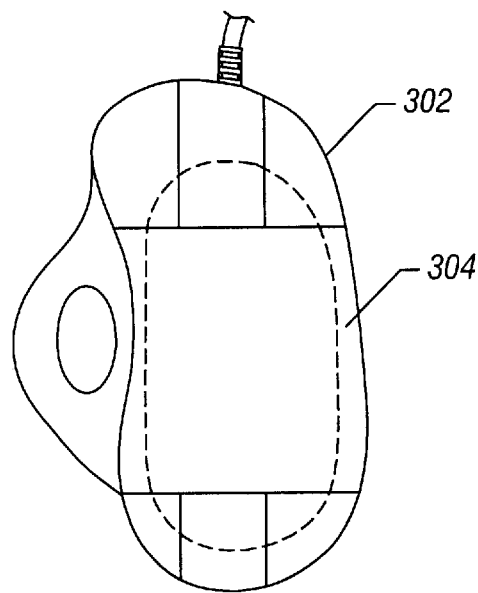

Referring now to FIG. 3A, an oblique view of a trackball pointer device in accordance with another embodiment of the invention is shown. Similar to mouse device 100, trackball 300 includes an ergonomically shaped shell 302 that removably couples to base 304. Shell 302 includes clasps and button tabs as did shell 102 of mouse device 100. Similarly, base 304 may include the same components (motion detection assembly, switches, etc.) as base 104 of mouse device 100. FIGS. 3B and 3C illustrate top views of ergonomically reversible trackball device 300 in the left-handed and right-handed configurations respectively.

In one embodiment, the motion detection assembly (e.g., 112) utilizes rollerball technology. In another embodiment, the motion detection assembly utilizes force sensitive resistor technology. In yet another embodiment, mouse 100 or trackball 300 is a wireless device employing, for example, infrared or radio frequency technology to communicate with a computer system (rather than a wired connection such as cable 116).

Figure 4:
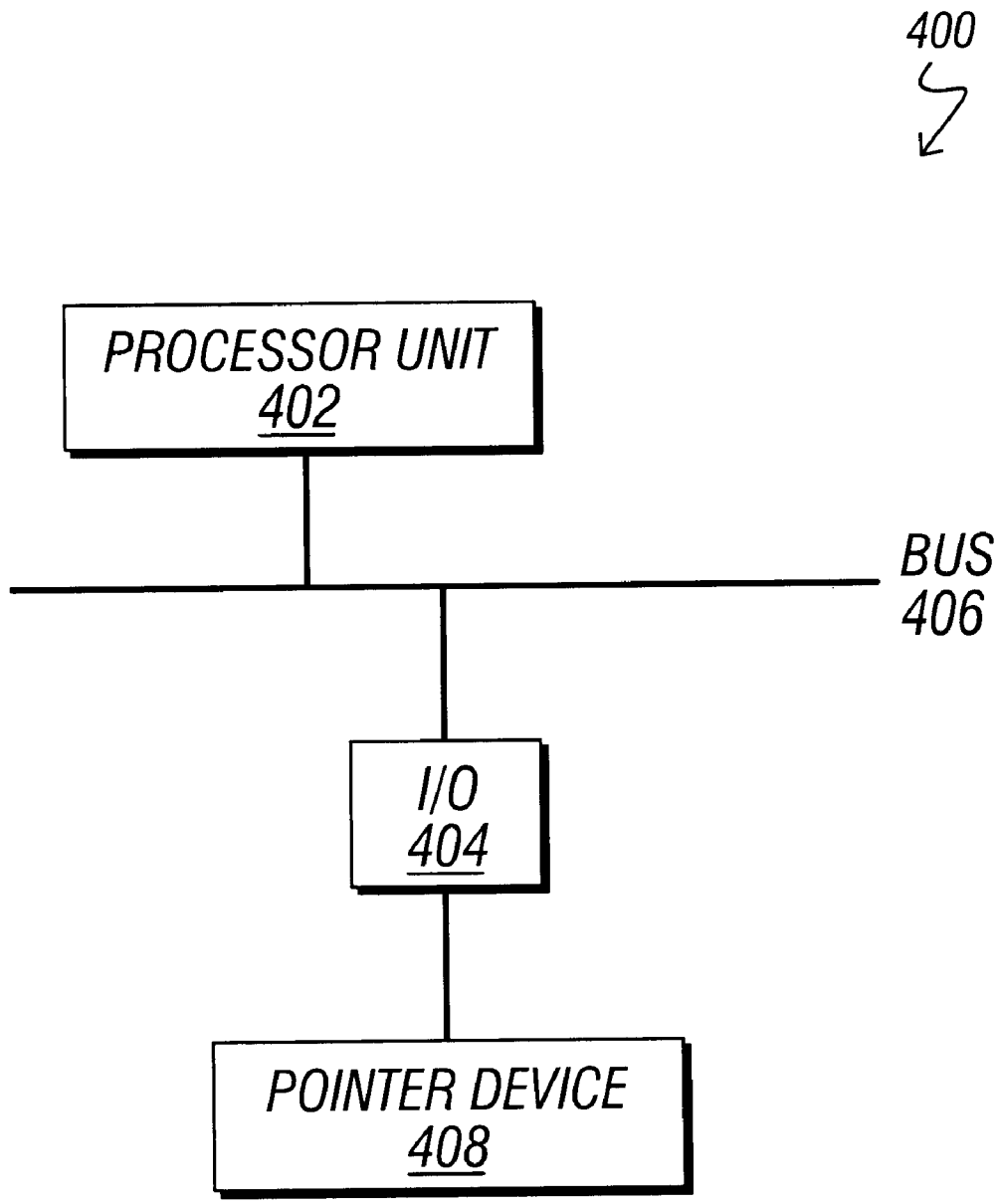
FIG. 4 shows a computer system including a pointer device in accordance with the invention.

Referring to FIG. 4, computer system 400 includes processor unit 402 and input-output (I/O) unit 404 coupled to bus 406. One of ordinary skill will recognize that processor unit 402 may include a central processing unit and memory. An ergonomically reversible pointer device 408 in accordance with the invention may be coupled to computer system 400 via I/O circuit 404. For example, pointer device 408 may be a mouse as illustrated in FIG. 1 or a trackball as illustrated in FIGS. 3A and 3B. Further, I/O unit 404 may support any desired communication technology. For example, pointer device 408 may be coupled to computer system 400 via a serial port I/O unit or a universal serial bus I/O unit.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A pointer device comprising:
a shell having a first set of one or more button tabs at a first end and a second set of one or more button tabs at a second end, and a first set of locking elements; and
a base having one or more switches and a second set of locking elements adapted to mate with the first set of locking elements, the first and second sets of locking elements adapted to allow the shell to be removably coupled to the base, said one or more switches adapted to be activated by the first set of one or more button tabs when the shell is attached to the base in a left-handed configuration and activated by the second set of one or more button tabs when the shell is attached to the base in a right-handed configuration different from the left-handed configuration.

2. The pointer device of claim 1, wherein the base further comprises one or more posts adapted to inhibit movement of the second set of one or more button tabs when the shell is coupled to the base in a left-handed configuration and the first set of one or more button tabs when the shell is coupled to the base in a right-handed configuration.

3. The pointer device of claim 1, further comprising an configuration indicator switch adapted to be activated when the shell is coupled to the base in a left-handed configuration.

4. The pointer device of claim 3, wherein the configuration indicator switch is mounted on the base and the shell has a protrusion on the underside of one of the one or more button tabs of the first set of button tabs, the protrusion adapted to activate the configuration indicator switch when the shell is coupled to the base in a left-handed configuration.

5. The pointer device of claim 1, wherein the base further comprises a motion detector assembly adapted to detect motion of the pointer device.

6. The pointer device of claim 5, wherein the motion detector assembly comprises a rotatable ball.

7. The pointer device of claim 5, wherein the motion detector assembly comprises a force sensitive resistor.

8. The pointer device of claim 1, wherein the base further comprises a communications means for transmitting signals to a computer system.

9. The pointer device of claim 8, wherein the communications means comprises an electrical conductor.

10. The pointer device of claim 8, wherein the communications means comprises a wireless communications means.

11. The pointer device of claim 10, wherein the wireless communications means comprises an infrared communications circuit.

12. The pointer device of claim 10, wherein the wireless communications means comprises a radio frequency communications circuit.

13. The pointer device of claim 1 wherein the shell provides an ergonomic mouse pointer device.

14. The pointer device of claim 1 wherein the shell provides an ergonomic trackball pointer device.

15. A computer system comprising:
a bus;
a processor module coupled to the bus; and
a pointer device coupled to the bus, the pointer device including:
a shell having a first set of one or more button tabs at a first end and a second set of one or more button tabs at a second end, and a first set of locking elements, and
a base having one or more switches and a second set of locking elements adapted to mate with the first set of locking elements, the first and second sets of locking elements adapted to allow the shell to be removably coupled to the base, said one or more switches adapted to be activated by the first set of one or more button tabs when the shell is attached to the base in a left-handed configuration and activated by the second set of one or more button tabs when the shell is attached to the base in a right-handed configuration different from the left-handed configuration.

16. The computer system of claim 15, wherein the base of the pointer device further comprises one or more posts adapted to inhibit movement of the second set of one or more button tabs when the shell is coupled to the base in a left-handed configuration and the first set of one or more button tabs when the shell is coupled to the base in a right-handed configuration.

17. The computer system of claim 15, wherein the pointer device further comprises a configuration indicator switch adapted to be activated when the shell is coupled to the base in a left-handed configuration.

18. The computer system of claim 17, wherein the configuration indicator switch is mounted on the base of the pointer device and the shell has a protrusion on the underside of one of the one or more button tabs of the first set of button tabs, the protrusion adapted to activate the configuration indicator switch when the shell is coupled to the base in a left-handed configuration.

19. The computer system of claim 15, wherein the base of the pointer device further comprises a motion detector assembly adapted to detect motion of the pointer device.

20. The computer system of claim 15, wherein the pointer device is coupled to the bus by a serial communications link.

21. The computer system of claim 20, wherein the serial communications link comprises a universal serial bus link.

22. The computer system of claim 20, wherein the serial communications link comprises a wireless communications link.

23. The pointer device of claim 22, wherein the wireless communications link comprises an infrared communications link.

24. The computer system of claim 15, wherein the pointer device comprises a trackball pointer device.

25. A pointer device comprising:
   a shell comprising a first button for right-handed operation and a second button for left-handed operation; and
   a base comprising a first switch activated for the left-handed operation in response to the shell being attached to the base in a first orientation and a second switch activated for right-handed operation in response to the shell being attached to the base in a different second orientation.

26. The pointer device of claim 25, wherein the base further comprises:
   a first post to inhibit operation of the first button for right-handed operation in response to the shell being attached to the base in the first orientation; and
   a second post to inhibit operation of the second button in response to the shell being attached to the base in the second orientation.

27. The pointer device of claim 25, further comprising:
   a indicator switch to indicate whether the shell is attached to the base in the first or the second orientation.

28. The pointer device of claim 27, wherein the indicator switch is activated by a protrusion on the shell.

29. The pointer device of claim 25, wherein the base further comprises:
   a motion detector assembly to detect motion of the pointer device.

30. The pointer device of claim 29, wherein the motion detector assembly comprises a rotatable ball.

31. The pointer device of claim 29, wherein the motion detector assembly comprises a force sensitive resistor.

32. The pointer device of claim 29, wherein the first and second orientations are separated by approximately one hundred eighty degrees.

33. A computer system comprising:
   a bus;
   a processor module coupled to the bus; and
   a pointer device coupled to the bus, the pointer device comprising:
      a shell comprising a first button for right-handed operation and a second button for left-handed operation; and
      a base comprising a first switch activated for the left-handed operation in response to the shell being attached to the base in a first orientation and a second switch activated for the right-handed operation in response to the shell being attached to the base in a different second orientation.

34. The computer system of claim 33, wherein the base further comprises:
   a first post to inhibit operation of the first button for the right-handed operation in response to the shell being attached to the base in the first orientation; and
   a second post to inhibit operation of the second button in response to the shell being attached to the base in the second orientation.

35. The computer system of claim 33, further comprising:
   a indicator switch to indicate whether the shell is coupled to the base in the first or the second orientation.

36. The computer system of claim 35, wherein the indicator switch is activated by a protrusion on the shell.

37. The computer system of claim 33, wherein the base further comprises:
   a motion detector assembly to detect motion of the pointer device.

38. The computer system of claim 37, wherein the motion detector assembly comprises a rotatable ball.

39. The computer system of claim 37, wherein the motion detector assembly comprises a force sensitive resistor.

40. The computer system of claim 33, wherein the first and second orientations are separated by approximately one hundred eighty degrees.

* * * * *